(12) United States Patent
Ahmed et al.

(10) Patent No.: US 8,699,550 B2
(45) Date of Patent: Apr. 15, 2014

(54) PHASE ALIGNMENT BETWEEN PHASE-SKEWED CLOCK DOMAINS

(75) Inventors: Yasser Ahmed, Allentown, PA (US); Xingdong Dai, Whitehall, PA (US)

(73) Assignee: LSI Corporation, San Jose, CA (US)

( * ) Notice: Subject to any disclaimer, the term of this patent is extended or adjusted under 35 U.S.C. 154(b) by 162 days.

(21) Appl. No.: 13/425,467

(22) Filed: Mar. 21, 2012

(65) Prior Publication Data

US 2013/0251007 A1 Sep. 26, 2013

(51) Int. Cl.
*H04B 1/38* (2006.01)
*H04L 5/16* (2006.01)

(52) U.S. Cl.
USPC .......................................... 375/219; 375/276

(58) Field of Classification Search
USPC ........................................................ 375/219
See application file for complete search history.

(56) References Cited

U.S. PATENT DOCUMENTS

| | | | |
|---|---|---|---|
| 6,744,285 B2 | 6/2004 | Mangum et al. | |
| 7,362,135 B1 * | 4/2008 | Chang | 326/47 |
| 7,500,131 B2 | 3/2009 | Panikkar et al. | |
| 7,716,514 B2 | 5/2010 | Baumgartner et al. | |
| 7,940,667 B1 * | 5/2011 | Coady et al. | 370/238 |
| 7,990,786 B2 * | 8/2011 | Chu et al. | 365/194 |
| 8,073,090 B2 | 12/2011 | Zhang et al. | |
| 2003/0117864 A1 * | 6/2003 | Hampel et al. | 365/200 |
| 2003/0161355 A1 * | 8/2003 | Falcomato et al. | 370/539 |
| 2006/0146967 A1 | 7/2006 | Panikkar et al. | |
| 2008/0291758 A1 * | 11/2008 | Chu et al. | 365/194 |
| 2009/0296503 A1 * | 12/2009 | Chu et al. | 365/193 |
| 2012/0311371 A1 * | 12/2012 | Shaeffer | 713/501 |
| 2013/0083611 A1 * | 4/2013 | Ware et al. | 365/191 |

\* cited by examiner

*Primary Examiner* — Erin File
(74) *Attorney, Agent, or Firm* — Mendelsohn, Drucker & Dunleavy, P.C.; Steve Mendelsohn

(57) ABSTRACT

In order to compensate for phase offset between different sets of circuitry having different synchronous clock domains, transmit (TX) circuitry of one domain is configured to transmit a pattern signal (e.g., a pseudo random bit sequence) to receive (RX) circuitry of the other domain. The RX circuitry cycles through a number of different phase-shifted RX clock signals to determine which selected clock signals result in valid RX pattern signals. The RX circuitry is then able to select one of the phase-shifted clock signals for use in normal processing of an RX data signal received from the TX circuitry.

18 Claims, 8 Drawing Sheets

FIG. 5

(A) TABLE 1: EXAMPLE 1 (PHASE 5 IS SELECTED)

| PHASE INDEX | 1 | 2 | 3 | 4 | 5 | 6 | 7 | 8 |
|---|---|---|---|---|---|---|---|---|
| PRBS STATUS | FAIL | FAIL | PASS | PASS | PASS | PASS | PASS | FAIL |

(B) TABLE 2: EXAMPLE 2 (PHASE 7 IS SELECTED)

| PHASE INDEX | 1 | 2 | 3 | 4 | 5 | 6 | 7 | 8 |
|---|---|---|---|---|---|---|---|---|
| PRBS STATUS | PASS | FAIL | FAIL | FAIL | PASS | PASS | PASS | PASS |

(C) TABLE 3: EXAMPLE 3 (EITHER PHASE 4 OR PHASE 5 IS SELECTED)

| PHASE INDEX | 1 | 2 | 3 | 4 | 5 | 6 | 7 | 8 |
|---|---|---|---|---|---|---|---|---|
| PRBS STATUS | FAIL | FAIL | PASS | PASS | PASS | PASS | FAIL | FAIL |

650

PHASE ALIGNMENT BETWEEN PHASE-SKEWED CLOCK DOMAINS

BACKGROUND

This section introduces aspects that may help facilitate a better understanding of the invention. Accordingly, the statements of this section are to be read in this light and are not to be understood as admissions about what is prior art or what is not prior art.

There are many applications in which data is transmitted between two different sets of circuitry operating at the same clock speed, but with unknown, and possibly varying, phase offset between those two clock domains. Depending on the particular situation, the two different sets of circuitry may reside on two different integrated circuits (i.e., chips) or on the same chip that is segmented into the two (or more) different clock domains. Note that, in some applications, the two clock domains also correspond to different power domains.

When data is transmitted from a first clock domain (referred to herein as Domain A) to a second clock domain (referred to herein as Domain B), the Domain A circuitry is said to have transmit (TX) circuitry designed to generate and transmit the outgoing data and the Domain B circuitry is said to have receive (RX) circuitry designed to receive and process the incoming data. Note that, for applications in which data is also transmitted from Domain B to Domain A, the Domain B circuitry will also be configured with an instance of the TX circuitry, and the Domain A circuitry will also be configured with an instance of the RX circuitry.

In order for the RX circuitry operating under the Domain B clock (CLKB) to be able to handle the received data transmitted from the TX circuitry operating under the Domain A clock (CLKA), the RX circuitry is implemented with phase-alignment circuitry that accommodates the phase offset between the TX clock signal CLKA of the TX circuitry and the RX clock signal CLKB of the RX circuitry.

One conventional solution is to transmit a copy of the TX clock signal CLKA from the TX circuitry to the RX circuitry, which is configured with a phase-locked loop (PLL) circuit that forces the phase of the RX clock signal CLKB to be substantially aligned with the phase of the received TX clock signal CLKA. Such PLL-based TX clock data recovery (TX-CDR) solutions are disadvantageous to implement due to the size, complexity, and power consumption of the PLL circuit. In addition, TXCDR solutions do not deliver the desired system stability when a low-speed jittery clock is used to modify high-frequency macro PLL clock outputs.

Another conventional solution is to provide synchronous FIFO (first-in, first-out) buffers in the RX circuitry, where the data is received into the FIFO buffers under the TX clock domain, but read out from the FIFO buffers under the RX clock domain. Although this solution is satisfactory for many applications, it is not acceptable for certain low-latency applications due to the one- to two-cycle delay added by the FIFO buffers.

SUMMARY

In one embodiment, the invention is an integrated circuit comprising at least one of (A) transmit (TX) circuitry in a TX clock domain having a TX clock signal and (B) receive (RX) circuitry in an RX clock domain (i) different from the TX clock domain and (ii) having an RX clock signal. The TX circuitry comprises (a) TX logic configured to generate a TX data signal, (b) a pattern generator configured to generate a TX pattern signal, and (c) one or more TX registers configured to transmit the TX data signal and the TX pattern signal based on the TX clock signal to the RX circuitry, The RX circuitry comprises (a) one or more RX registers configured to receive the TX data signal and the TX pattern signal transmitted from the TX circuitry and output an RX data signal and an RX pattern signal based on a selected RX clock signal of the RX clock domain, (b) receive logic configured to process the RX data signal, (c) a pattern checker configured to determine whether the RX pattern signal represents a valid pattern, (d) a multi-phase clock source configured to generate a plurality of phase-shifted versions of the RX clock signal, (e) a clock multiplexer (mux) configured to receive the plurality of phase-shifted versions of the RX clock signal and output the selected RX clock signal based on a clock mux control signal, and (f) a controller configured to receive the determinations of the pattern checker for different phase-shifted versions of the RX clock signal and generate the clock mux control signal.

BRIEF DESCRIPTION OF THE DRAWINGS

Other embodiments of the disclosure will become more fully apparent from the following detailed description, the appended claims, and the accompanying drawings in which like reference numerals identify similar or identical elements.

FIG. 5 shows three different tables representing three different sets of results for an implementation of FIG. 1 in which there are M=8 different phase-shifted clock signals;

DETAILED DESCRIPTION

Figure 1:
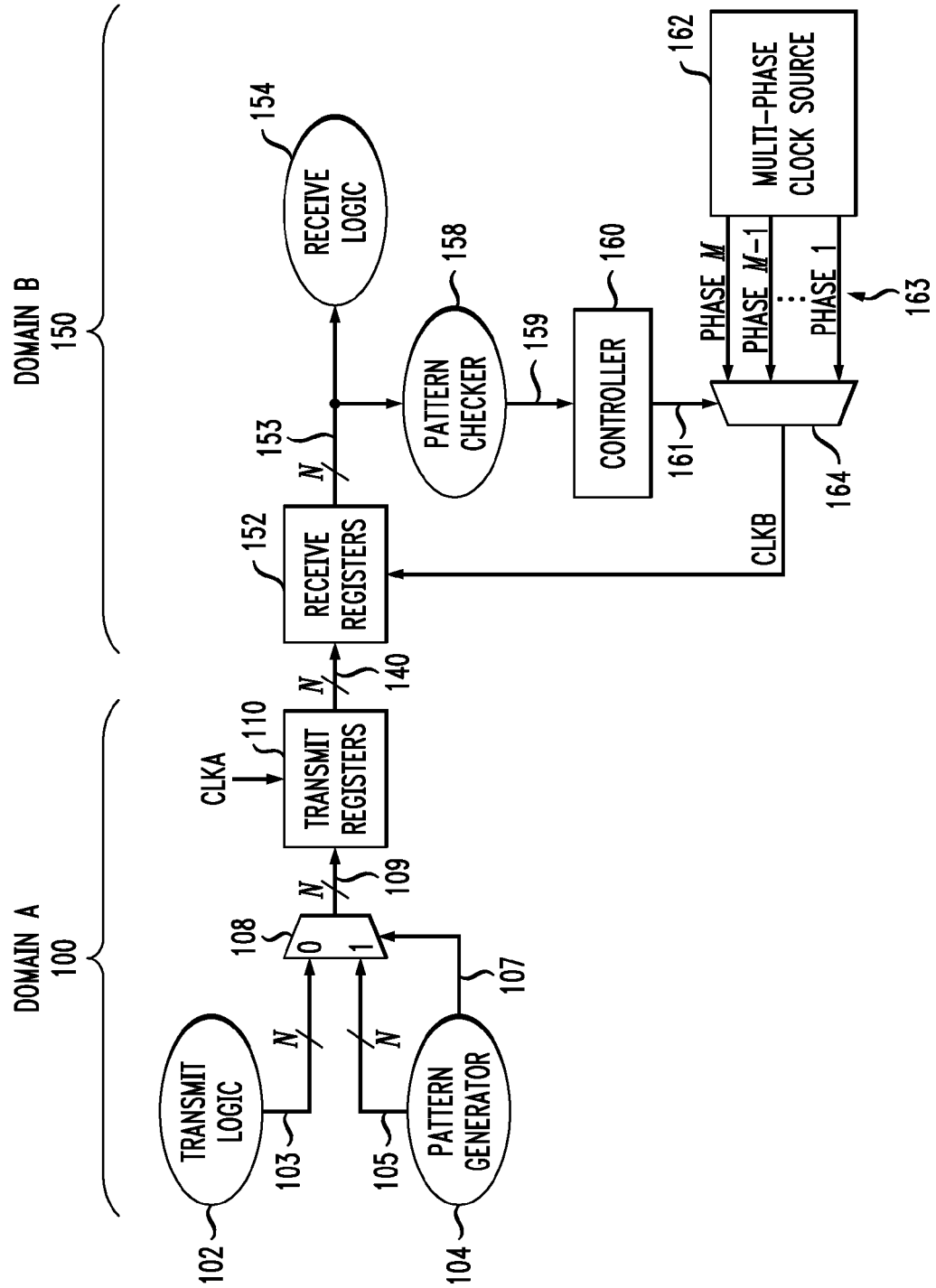
FIG. 1 shows a schematic block diagram of portions of two different sets of circuitry having two different clock domains, according to one embodiment of the disclosure.

FIG. 1 shows a schematic block diagram of portions of two different sets of circuitry 100 and 150 having two different clock domains: Domain A and Domain B, according to one embodiment of the disclosure. In particular, FIG. 1 shows the TX circuitry of Domain A operating under TX clock signal CLKA and the RX circuitry of Domain B operating under RX clock signal CLKB. Depending on the particular application, the two different sets of circuitry also may have, but do not have to have, two different power domains. Depending on the particular implementation, circuitry 100 and circuitry 150 may be implemented on separate chips or as different segments of a single chip. Although Domains A and B are synchronous (e.g., the frequency of CLKB can be equal to or a multiple of the frequency of CLKA), there is an (initially unknown) phase offset between the two domains.

One possible application for the architecture shown in FIG. 1 is in the synchronization of multiple TX lanes across a plurality of serializer/deserializer (SERDES) macros. A wide bus configuration is mandated in many serial link standards such as PCI Express (PCIe), where strict lane-to-lane bit-skew control is demanded.

Figure 2:
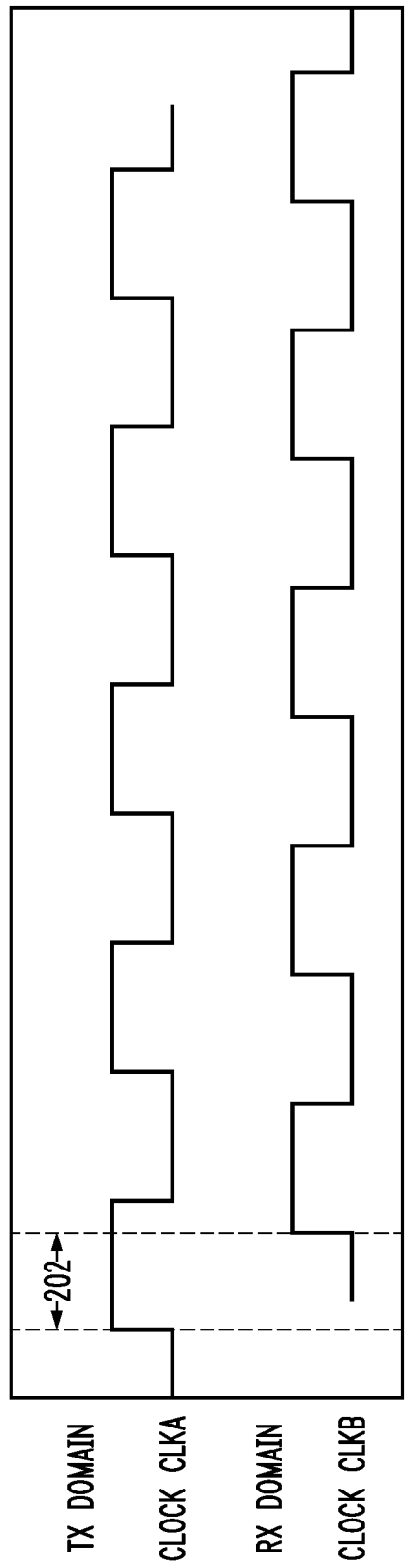
FIG. 2 graphically represents an exemplary phase offset between the synchronous TX and RX clock signals CLKA and CLKB of the two different sets of circuitry of FIG. 1.

FIG. 2 graphically represents an exemplary phase offset 202 between the synchronous TX and RX clock signals CLKA and CLKB of the two different sets of circuitry 100 and 150 of FIG. 1.

Referring again to FIG. 1, in general, both Domain A circuitry 100 and Domain B circuitry 150 will typically have other components that are not represented in FIG. 1, including, for example, TX circuitry in Domain B circuitry 150 and RX circuitry in Domain A circuitry 100.

As shown in FIG. 1, the TX circuitry includes TX logic 102, pattern generator 104, (2×1) TX multiplexer (mux) 108, and N TX registers 110, while the RX circuitry includes N RX registers 152, RX logic 154, pattern checker 158, controller 160, (M×1) clock mux 164, and multi-phase clock source 162.

TX logic 102 generates an N-bit parallel data signal 103, and pattern generator 104 generates an N-bit parallel pattern signal 105 and a 1-bit TX mux control signal 107. Depending on the value of TX mux control signal 107, TX mux 108 will output either data signal 103 or pattern signal 105 as N-bit signal 109, which is stored in the N TX registers 110 and transmitted, over N-bit parallel bus 140, to the RX circuitry based on the timing of the TX clock signal CLKA. Note that, for N-bit signals, TX mux 108 may be implemented using N (2×1) muxes.

The N RX registers 152 receive the transmitted signal from bus 140 and output N-bit RX signal 153 based on the timing of the selected RX clock signal CLKB. RX logic 154 receives and processes one copy of RX signal 153 based on the functionality of the particular application for which the Domain B circuitry 150 is configured. In addition, another copy of RX signal 153 is applied to pattern checker 158, which determines whether or not RX signal 153 represents a valid pattern. Controller 160 receives the resulting pattern-check status signal 159 from pattern checker 158 and generates a clock-mux control signal 161.

Multi-phase clock source 162 generates M phase-shifted versions 163 of the Domain B clock signal. (M×1) clock mux 164 receives the M clock signals 163 and selects one of them to be the selected RX clock signal CLKB based on the value of clock-mux control signal 161.

Figure 3:
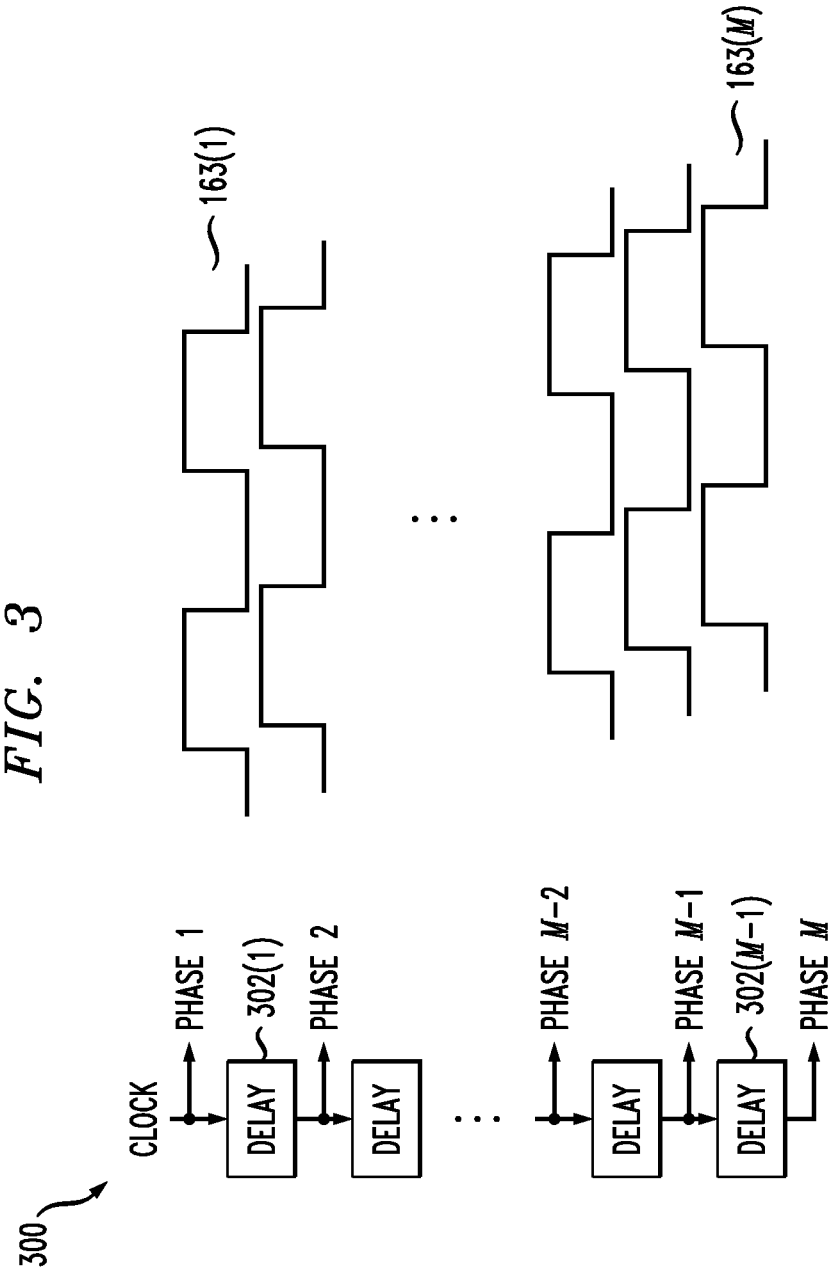
FIG. 3 shows a diagram representing the multi-phase clock source of FIG. 1 according to one embodiment.

FIG. 3 shows a diagram representing multi-phase clock source 162 of FIG. 1 according to one embodiment. As shown in FIG. 3, multi-phase clock source 162 has a delay chain 300 consisting of a series configuration of (M−1) clock delay units 302(1)-302(M−1), each of which delays its received clock signal by a fraction (e.g., 1/M) of a full clock period, to generate the M phase-shifted clock signals 163(1)-163(M) of FIG. 1. In alternative embodiments, multi-phase clock source 162 can be implemented using PLLs or delay-locked loops (DLLs) that can generate multiple phase-shifted versions of a clock signal.

Referring again to FIG. 1, in operation, when the TX circuitry does not have a meaningful data signal 103 to be transmitted to the RX circuitry (e.g., after the device wakes up from a low-power or power-down state), pattern generator 104 can set mux control signal 107 to cause TX mux 108 to select pattern signal 105 for transmission to the RX circuitry over bus 140.

In one implementation, pattern signal 105 represents a pseudo-random bit sequence (PRBS), such as the well-known PN(7) sequence, and pattern checker 158 is designed to determine whether RX signal 153 conforms to that PRBS sequence. For example, pattern checker 158 may be configured with linear shift registers that generate output values based on using RX signal 153 as a seed value. If, after a specified number of cycles, the output generated by the linear shift registers matches the seed value, then pattern checker 158 determines that RX signal 153 is valid. Otherwise, the output does not match the seed value, and pattern checker 158 determines that RX signal 153 is not valid.

The RX circuitry is designed such that, at chip power up or reset, clock mux 164 will select, by default, a specific one (e.g., the first) of the M phase-shifted clock signals 163 as the selected RX clock signal CLKB. Depending on the phase offset between the TX clock signal CLKA used to transmit pattern signal 105 and the selected RX clock signal CLKB, RX signal 153 provided to pattern checker 158 will either be valid or not valid. If the phase offset is sufficiently small, then RX signal 153 will accurately represent pattern signal 105, and pattern checker 158 will determine that RX signal 153 is valid. Otherwise, the phase offset is too large, RX signal 153 will not accurately represent pattern signal 105, and pattern checker 158 will determine that RX signal 153 is not valid.

In operation, controller 160 implements an alignment state machine that (e.g., sequentially) cycles through the M different phase-shifted clock signals 163 as the selected RX clock signal CLKB, with pattern checker 158 determining, for each different selected clock signal, whether RX signal 153 is valid. Controller 160 collects the pattern-check results for the M different clock signals 163 and then determines an appropriate, substantially phase-aligned clock signal 163 to be selected as clock signal CLKB for normal processing (i.e., when a meaningful data signal 103 is transmitted from the TX circuitry to the RX circuitry).

Figure 4:
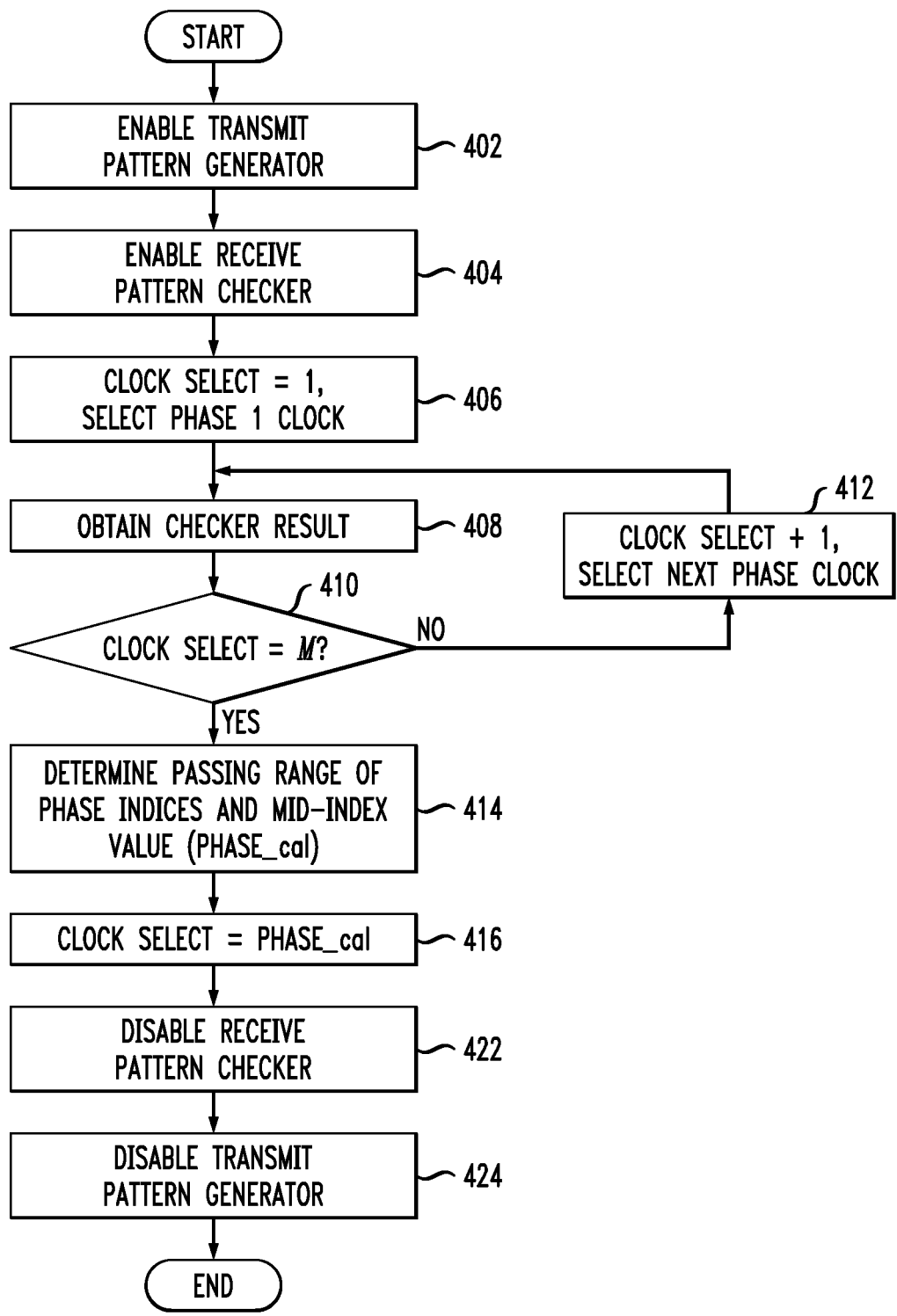
FIG. 4 shows a flow diagram of the phase-alignment processing for FIG. 1.

FIG. 4 shows a flow diagram of the phase-alignment processing for FIG. 1. In step 402, pattern generator 104 is enabled, such that pattern signal 105 is generated, and mux control signal 107 is set to cause TX mux 108 to select pattern signal 105 to be transmitted to the RX circuitry. In step 404, pattern checker 158 is enabled, such that pattern checker 158 determines whether RX signal 153 is valid (i.e., accurately represents the PRBS sequence of pattern signal 105).

In step 406, controller 160 sets mux control signal 161 to cause clock mux 164 to select the first phase-shifted clock signal 163(1) as RX clock signal CLKB, and, in step 408, controller 160 obtains pattern-check status signal 159 from pattern checker 158 for the selected RX clock signal CLKB. In step 410, controller 160 determines whether the selected RX clock signal CLKB corresponds to the last phase-shifted clock signal 163(M). If not, then, in step 412, controller 160 selects the next phase-shifted clock signal 163 to be the selected RX clock signal CLKB and processing returns to step 408. After all M phase-shifted clock signals 163 have been sequentially selected as the RX clock signal CLKB, processing proceeds to step 414.

In step 414, controller 160 analyzes which phase-shifted clock signals 163 resulted in valid determinations by pattern checker 158 and, in step 416, selects one of those clock signals 163 to be used as the selected RX clock signal CLKB for normal operations. In typical scenarios, two or more consecutive phase-shifted clock signals 163 will result in valid determinations by pattern checker 158. In that case, the "middle" clock signal 163 will typically be most closely phase-aligned with the TX clock signal CLKA, and controller 160 controls clock mux 164 to select that middle clock signal 163 for the RX clock signal CLKB for normal operations.

FIG. 5 shows three different tables representing three different sets of results for an implementation of FIG. 1 in which there are M=8 different phase-shifted clock signals 163. In Table 1, clock signals 163(3)-163(7) all resulted in valid determinations, and middle clock signal 163(5) is selected. In Table 2, clock signals 163(1) and 163(5)-163(8) all resulted in valid determinations, and middle clock signal 163(7) is selected, taking into account the wrap-around from the last block signal 163(8) to the first clock signal 163(1). In Table 3, clock signals 163(3)-163(6) all resulted in valid determinations, and, since there are an even number of valid determinations, either clock signal 163(4) may be selected (using a so-called floor algorithm) or clock signal 163(5) may be selected (using a so-called ceiling algorithm).

Referring again to FIG. 4, in step 422, pattern checker 158 is disabled, and, in step 424, pattern generator 104 is disabled, which results in mux control signal 107 returning to its default value to cause TX mux 108 to select data signal 103 for transmission to the RX circuitry.

Figure 6:
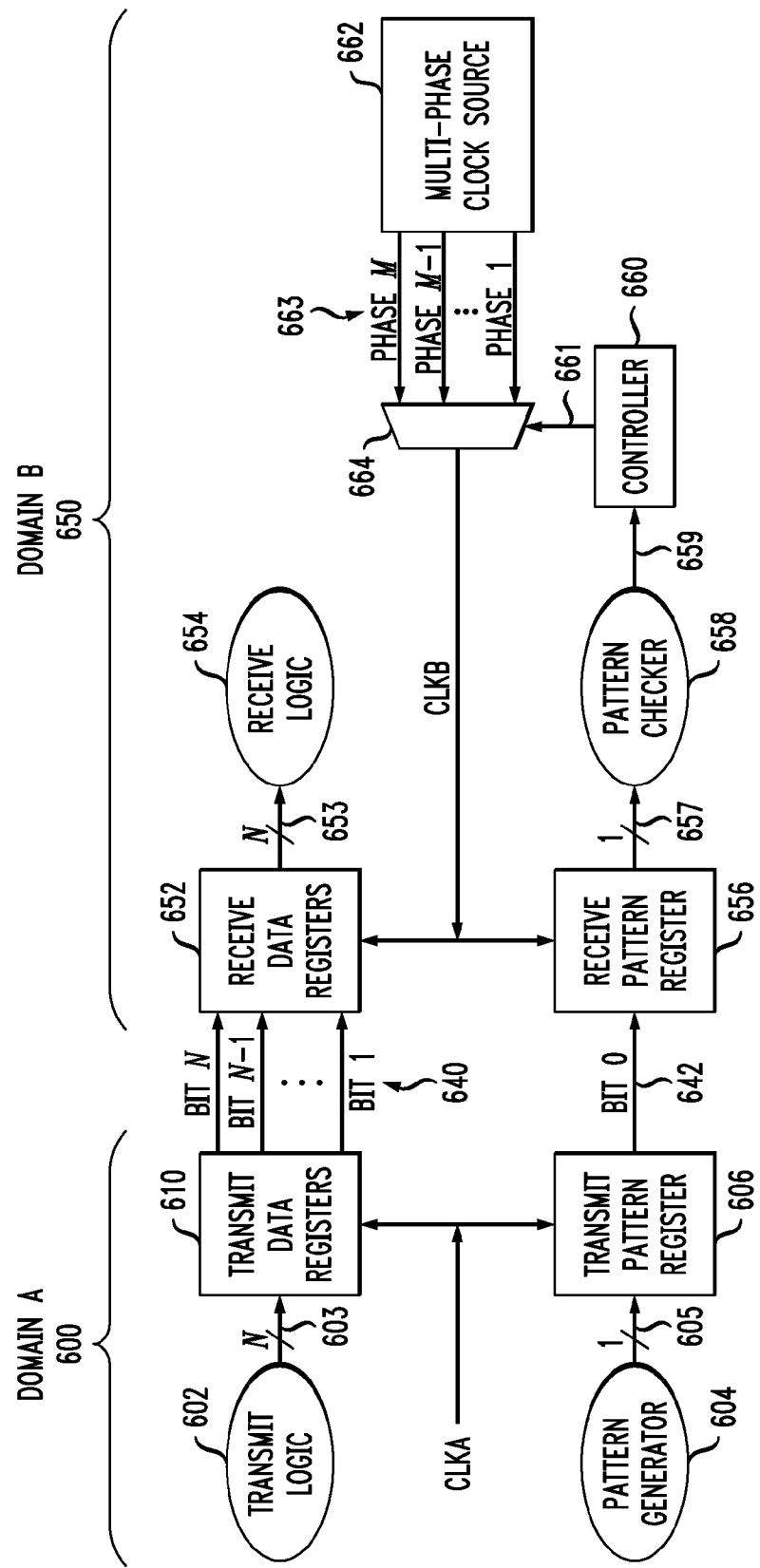
FIG. 6 shows a schematic block diagram of portions of two different sets of circuitry having two different clock domains, according to an alternative embodiment of the disclosure.

FIG. 6 shows a schematic block diagram of portions of two different sets of circuitry 600 and 650 having two different clock domains: TX Domain A and RX Domain B, according to an alternative embodiment of the disclosure. Unlike the embodiment of FIG. 1, in which the TX circuitry transmits data signal 103 and pattern signal 105 non-concurrently to the RX circuitry over shared bus 140, in the embodiment of FIG. 6, the TX circuitry transmits data signal 603 and pattern signal 605 to the RX circuitry over different respective buses 640 and 642, either non-concurrently or concurrently.

As in FIG. 1, FIG. 6 shows the TX circuitry of Domain A circuitry 600 associated with transmitting data to Domain B circuitry 650, and the RX circuitry of Domain B circuitry 650 associated with receiving data from Domain A circuitry 600. In general, as in FIG. 1, both Domain A circuitry 600 and Domain B circuitry 650 will typically have other components that are not represented in FIG. 6.

As shown in FIG. 6, the TX circuitry includes TX logic 602, pattern generator 604, N data TX registers 610, and one pattern TX register 606, while the RX circuitry includes N data RX registers 652, RX logic 654, one pattern RX register 656, pattern checker 658, controller 660, (M×1) clock mux 664, and multi-phase clock source 662, where certain elements of FIG. 6 provide analogous functionality as the corresponding elements of FIG. 1.

TX logic 602 generates and provides N-bit parallel data signal 603 to the N data TX registers 610, which transmit data signal 603 from the TX circuitry to the RX circuitry over N-bit bus 640 based on the timing of the TX clock signal CLKA. At the same or different time, pattern generator 604 generates and provides 1-bit serial pattern signal 605 to pattern TX register 606, which transmits pattern signal 605 from the TX circuitry to the RX circuitry over 1-bit bus 642 also based on the timing of the TX clock signal CLKA.

The N data RX registers 652 receive the transmitted data signal 603 from bus 640 and output N-bit RX data signal 653 based on the timing of the selected RX clock signal CLKB. RX logic 654 receives and processes RX data signal 653 based on the functionality of the particular application for which the Domain B circuitry 650 is configured. At the same or different time, pattern RX register 656 receives the transmitted pattern signal 605 from bus 642 and outputs serial RX pattern signal 657 also based on the timing of the selected RX clock signal CLKB. RX pattern signal 657 is applied to pattern checker 658, which determines whether or not RX pattern signal 657 represents a valid pattern. Controller 660 receives the resulting pattern-check status signal 659 from pattern checker 658 and generates a clock-mux control signal 661.

Multi-phase clock source 662 generates M phase-shifted versions 663 of the Domain B clock signal. (M×1) clock mux 664 receives the M clock signals 663 and selects one of them to be the selected RX clock signal CLKB based on clock-mux control signal 661. Multi-phase clock source 662 can be implemented using the same architecture shown in FIG. 3 for multi-phase clock source 162 of FIG. 1.

Like pattern generator 104 and pattern checker 158 of FIG. 1, pattern generator 604 and pattern checker 658 of FIG. 6 are designed to, respectively, generate and process a pattern signal representing an appropriate PRBS sequence, such as the PN(7) sequence, although, in FIG. 6, pattern signal 605 is a serial signal instead of a parallel signal. In alternative implementations of FIG. 6, pattern signal 605 can be a multi-bit parallel signal having the same or different number of bits as N-bit data signal 603.

The RX circuitry is designed such that, at chip power up or reset, clock mux 664 will select, by default, a specific one (e.g., the first) of the M phase-shifted clock signals 663 as the selected RX clock signal CLKB. In operation, controller 660 implements an alignment state machine that (e.g., sequentially) cycles through the M different phase-shifted clock signals 663 as the selected RX clock signal CLKB, with pattern checker 658 determining, for each different clock signal, whether RX pattern signal 657 is valid. Controller 660 collects the results for the M different clock signals 663 and then determines an appropriate, substantially phase-aligned clock signal 663 to be selected as RX clock signal CLKB for normal processing.

Figure 7:
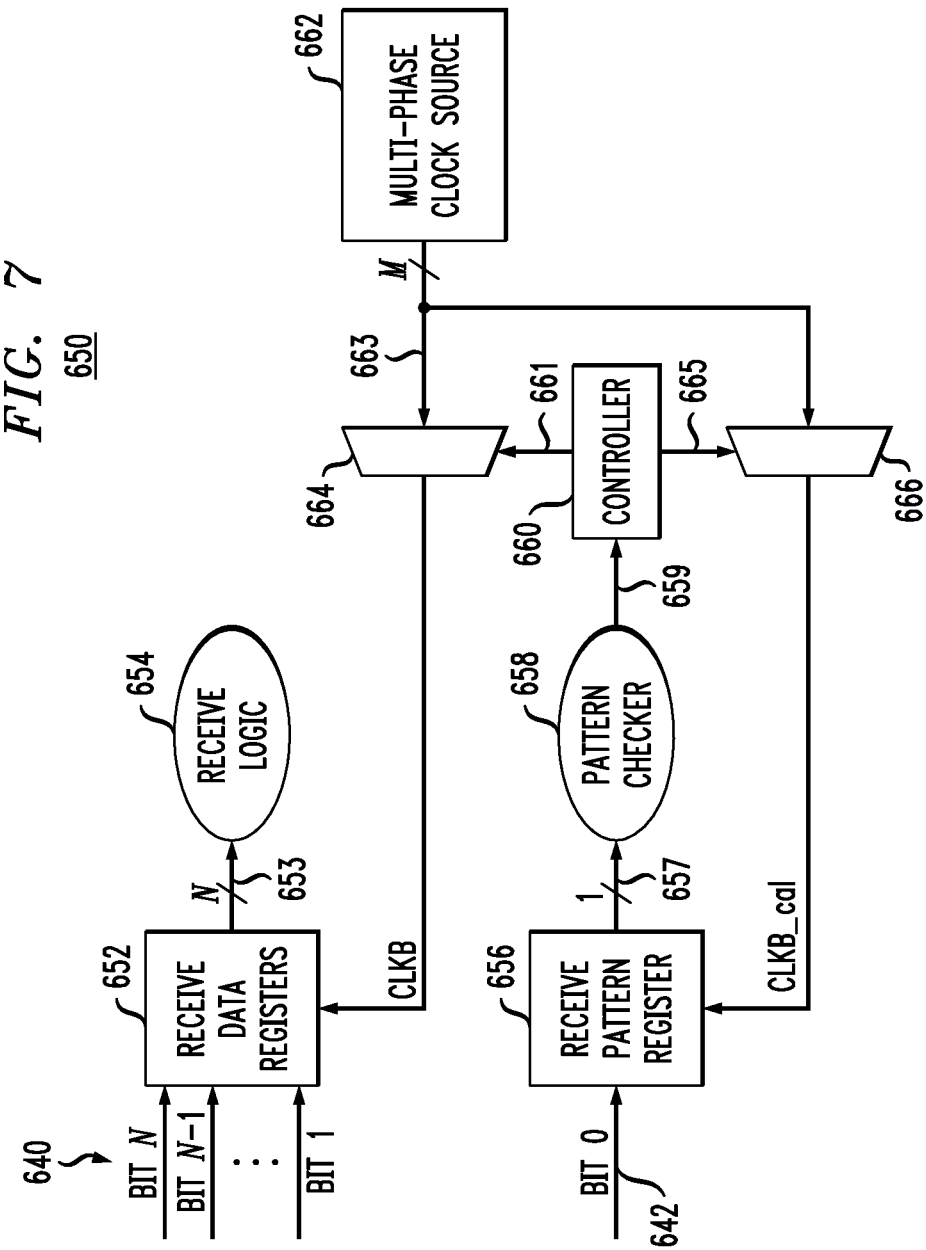
FIG. 7 shows a schematic block diagram of RX circuitry according to an alternative implementation of the embodiment of FIG. 6.

FIG. 7 shows a schematic block diagram of RX circuitry according to an alternative implementation of the embodiment of FIG. 6. In the implementation shown in FIG. 6, data RX registers 652 and pattern RX register 656 are both clocked by the same selected RX clock signal CLKB. In the implementation shown in FIG. 7, however, data RX registers 652 and pattern RX register 656 are clocked by respective selected RX clock signals CLKB and CLKB_cal, where CLKB_cal can be (but does not have to be) different from CLKB.

As shown in FIG. 7, there is a second clock mux (i.e., RX calibration clock-select mux 666) that is controlled by a second mux control signal (i.e., calibration clock-select mux control signal 665) generated by controller 660. In this implementation, controller 660 can independently control muxes 664 and 666 to select the same or different phase-shifted clock signals 663 for CLKB and CLKB_cal. This enables the RX circuitry to continuously monitor the phase offset between the TX domain and the RX domain in a real-time supervisory loop, without having to disrupt the normal processing of RX data signal 653. Since, as indicated in FIG. 5, at any given time, different phase-shifted clock signals 663 can produce a valid RX pattern signal 657, the supervisory loop may be able to detect and track changes in the phase offset between the TX and RX domains and update the selected RX clock signal CLKB to be based on different clock signals 663 as necessary without ever interrupting the normal processing of RX data signal 653 by RX logic 654.

Figure 8:
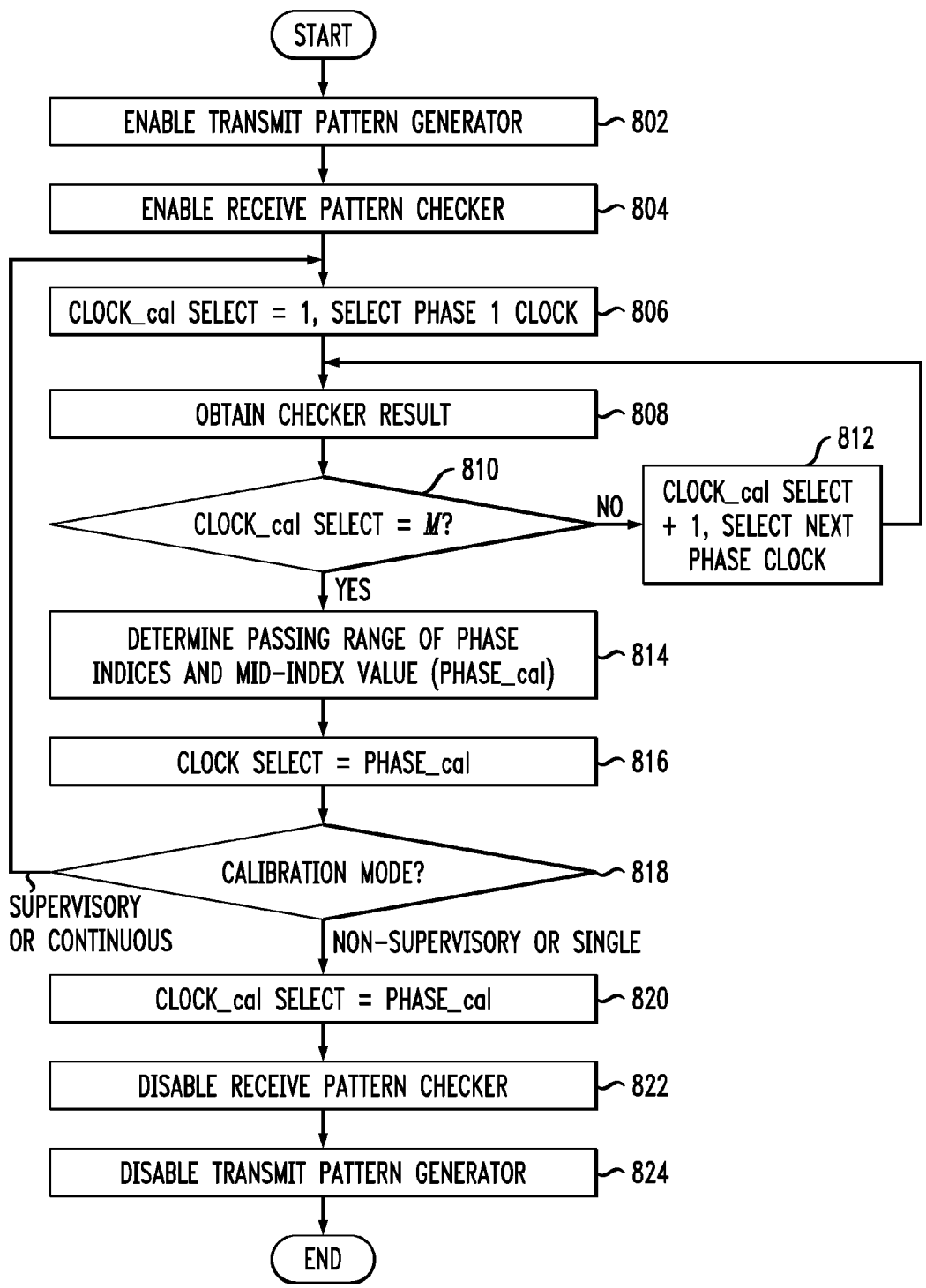
FIG. 8 shows a flow diagram of the phase-alignment processing for the RX circuitry of FIG. 7 in combination with the TX circuitry of FIG. 6.

FIG. 8 shows a flow diagram of the phase-alignment processing for the RX circuitry of FIG. 7 in combination with the TX circuitry of FIG. 6. In step 802, pattern generator 604 is enabled, such that pattern signal 605 is generated and transmitted to the RX circuitry. In step 804, pattern checker 658 is enabled, such that pattern checker 658 determines whether RX pattern signal 657 is valid (i.e., accurately represents the PRBS sequence of pattern signal 605).

In step 806, controller 660 sets calibration mux control signal 665 to cause calibration clock mux 666 to select the first phase-shifted clock signal 663(1) as RX calibration clock signal CLKB_cal, and, in step 808, controller 660 obtains pattern-check status signal 659 from pattern checker 658 for the selected RX calibration clock signal CLKB_cal. Note that, in general, when step 806 is implemented, controller 660 will maintain the previous value for clock-mux control signal 661 to cause clock mux 664 to continue to set the RX clock signal CLKB to be the phase-shifted clock signal 663 previously selected by controller 660. In step 810, controller 660 determines whether the selected RX calibration clock signal CLKB_cal corresponds to the last phase-shifted clock signal 663(M). If not, then, in step 812, controller 660 selects the next phase-shifted clock signal 663 as the selected RX calibration clock signal CLKB_cal and processing returns to step 808. After all M phase-shifted clock signals 663 have been selected as the RX calibration clock signal CLKB_cal, processing proceeds to step 814.

In step 814, controller 660 analyzes which phase-shifted clock signals 663 resulted in valid determinations by pattern checker 658 and, in step 816, selects one of those clock signals 663 to be used as the selected RX clock signal CLKB for normal operations. This clock selection is typically similar to that previously described in the context of FIG. 5.

Referring again to FIG. 4, in step 818, if controller 660 is configured to be in a supervisory or continuous mode, then processing returns to step 806 to re-do the sequential selection of all M phase-shifted clock signals 663 to determine if the phase offset between the TX and RX domains has changed enough to warrant selecting a different phase-shifted clock signal 663 to be used as the selected RX clock signal CLKB for normal operations.

If controller 660 is configured to be in a non-supervisory or single-scan mode, then processing continues to step 820, where controller 660 sets calibration mux control signal 665 to cause calibration clock mux 666 to select the same phase-shifted clock signal 663 for the RX calibration clock signal CLKB_cal as was selected for the RX data clock signal CLKB in step 816. In step 822, pattern checker 658 is disabled, and, in step 824, pattern generator 604 is disabled.

In an alternative operational scheme, after step 820, pattern generator 604 and pattern checker 658 both remain enabled. In this case, controller 660 will be able to detect if and when the phase offset between the TX and RX domains has changed since the last calibration sufficiently to cause the RX pattern signal 657 to be invalid. In that event, controller 660 can re-initiate a calibration sequence to re-align the TX and RX domains in phase.

In order for the phase-alignment technique of FIGS. 6 and 7 to be optimally effective, the delays associated with transmitting and receiving pattern signal 605 should be sufficiently similar to the delays associated with transmitting and receiving data signal 603, such that a determination of the validity of pattern signal 605 will be an appropriate indication of the accurateness of data signal 603. As such, it is preferable to physically co-locate and interleave the elements associated with transmitting and receiving pattern signal 605 with those associated with transmitting and receiving data signal 603. Such co-location and interleaving helps to guard against variations introduced by power management schemes and/or by process-voltage-temperature (PVT) changes. In one possible implementation, pattern TX register 606 is physically located in the middle of data TX registers 610 (e.g., between register 610(8) and register 610(9) for an implementation in which data signal 603 is an N=16-bit signal). Similarly, 1-bit bus 642 is physically located in the middle of the wires forming N-bit bus 640, and pattern RX register 656 is physically located in the middle of data RX registers 652.

As would be understood by those skilled in the art, the TX and RX circuitries of FIGS. 1, 6, and 7 enable the RX clock signal CLKB to be sufficiently aligned in phase with the TX clock signal CLKA without incurring (i) the additional latency penalty associated with synchronous FIFO-based phase-alignment techniques and (ii) the additional expense associated with PLL-based phase-alignment techniques.

Although the disclosure has been described in the context of TX circuitry having a TX clock domain and RX circuitry having an RX clock domain, in some applications, data is transmitted in both directions between two different sets of circuitry. In that case, each domain will have (i) an instance of the TX circuitry for data that it is transmitting to the other domain and (ii) an instance of the RX circuitry for data that it is receiving from the other domain.

Depending on the application, the two different sets of circuitry may correspond to two different chips or may be part of a single chip. Furthermore, there may be one or more other clock domains either on the same chip, as in a large ASIC, or on different chips that have analogous TX and RX relationships with the same or other sets of circuitry.

Although the disclosure has been described in the context of data being transmitted between different sets of circuitry using a parallel data signal, embodiments of the disclosure can also be implemented in the context of a serial data signal.

As used in this specification, the term "synchronous" refers to different clock domains having either the same clock frequency or two different clock frequencies that are related to one another by an integer factor.

Embodiments of the disclosure may be implemented as (analog, digital, or a hybrid of both analog and digital) circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, microcontroller, general-purpose computer, or other processor.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

Signals and corresponding nodes or ports may be referred to by the same name and are interchangeable for purposes here.

Embodiments of the disclosure can be embodied in the form of methods and apparatuses for practicing those methods. Embodiments of the disclosure can also be embodied in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing embodiments of the disclosure. Embodiments of the disclosure can also be embodied in the form of program code, for example, stored in a non-transitory machine-readable storage medium including being loaded into and/or executed by a machine, wherein, when the program code is loaded into and executed by a machine, such as a computer, the machine becomes an apparatus for practicing embodiments of the disclosure. When implemented on a general-purpose processor, the program code segments combine with the processor to provide a unique device that operates analogously to specific logic circuits.

It should be appreciated by those of ordinary skill in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Unless explicitly stated otherwise, each numerical value and range should be interpreted as being approximate as if the word "about" or "approximately" preceded the value of the value or range.

It will be further understood that various changes in the details, materials, and arrangements of the parts (e.g., if appropriate, circuits, sub-circuits, and components) which have been described and illustrated in order to explain embodiments of the disclosure may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the disclosure.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

What is claimed is:

1. An integrated circuit comprising at least one of (A) transmit (TX) circuitry in a TX clock domain having a TX clock signal and (B) receive (RX) circuitry in an RX clock domain (i) different from the TX clock domain and (ii) having an RX clock signal, wherein:
   the TX circuitry comprises:
   TX logic configured to generate a TX data signal;
   a pattern generator configured to generate a TX pattern signal; and
   one or more TX registers configured to transmit the TX data signal and the TX pattern signal based on the TX clock signal to the RX circuitry; and
   the RX circuitry comprises:
   one or more RX registers configured to receive the TX data signal and the TX pattern signal transmitted from the TX circuitry and output an RX data signal and an RX pattern signal based on a selected RX clock signal of the RX clock domain;
   receive logic configured to process the RX data signal;
   a pattern checker configured to determine whether the RX pattern signal represents a valid pattern;
   a multi-phase clock source configured to generate a plurality of phase-shifted versions of the RX clock signal;
   a clock multiplexer (mux) configured to receive the plurality of phase-shifted versions of the RX clock signal and output the selected RX clock signal based on a clock mux control signal; and
   a controller configured to receive the determinations of the pattern checker for different phase-shifted versions of the RX clock signal and generate the clock mux control signal.

2. The invention of claim 1, wherein the integrated circuit comprises the TX circuitry.

3. The invention of claim 1, wherein the integrated circuit comprises the RX circuitry.

4. The invention of claim 3, wherein the integrated circuit further comprises the TX circuitry.

5. The invention of claim 1, wherein the TX data signal and the TX pattern signal are transmitted non-concurrently from the TX circuitry to the RX circuitry using a shared bus.

6. The invention of claim 5, wherein the TX circuitry further comprises a TX mux configured to selectively output one of the TX data signal and the TX pattern signal to the one or more TX registers based on a TX mux control signal generated by the TX circuitry.

7. The invention of claim 5, wherein:
   the one or more TX registers are shared TX registers for both the TX data signal and the TX pattern signal; and
   the one or more RX registers are shared RX registers for both the RX data signal and the RX pattern signal.

8. The invention of claim 1, wherein:
   the TX data signal is transmitted from the TX circuitry to the RX circuitry using a first bus; and
   the TX pattern signal is transmitted from the TX circuitry to the RX circuitry using a second bus different from the first bus.

9. The invention of claim 8, wherein the one or more TX registers are configured to transmit the TX data signal and the TX pattern signal concurrently.

10. The invention of claim 8, wherein:
    the TX data signal is a parallel signal and the first bus is a parallel bus;
    the one or more TX registers comprise a plurality of TX data registers and at least one TX pattern register; and
    the one or more RX registers comprise a plurality of RX data registers and at least one RX pattern register.

11. The invention of claim 10, wherein:
    the at least one TX pattern register is physically co-located and interleaved with the plurality of TX data registers;
    the second bus is physically co-located and interleaved with the first bus; and
    the at least one RX pattern register is physically co-located and interleaved with the plurality of RX data registers.

12. The invention of claim 10, wherein the selected RX clock signal is used to output (i) the RX data signal from the plurality of RX data registers and (ii) the RX pattern signal from the at least one RX pattern register.

13. The invention of claim 10, wherein the RX circuitry further comprises a calibration clock mux configured to receive the plurality of phase-shifted versions of the RX clock signal from the multi-phase clock source and output a calibration RX clock signal based on a calibration clock mux control signal generated by the controller, wherein:

the selected RX clock signal is used to output the RX data signal from the plurality of RX data registers; and the calibration RX clock signal is used to output the RX pattern signal from the at least one RX pattern register.

14. The invention of claim 13, wherein the controller is configured to generate the calibration clock mux control signal to be different from the clock mux control signal such that the calibration RX clock signal is different from the selected RX clock signal.

15. The invention of claim 8, wherein:

the TX pattern signal is a serial signal;

the one or more TX registers include a single TX pattern register;

the second bus is a serial bus; and the one or more RX registers include a single RX pattern register.

16. The invention of claim 1, wherein no clock signal is explicitly transmitted from the TX circuitry to the RX circuitry.

17. The invention of claim 1, wherein no clock calibration signal is transmitted from the RX circuitry back to the TX circuitry.

18. The invention of claim 1, wherein the RX circuitry has its own independent local clock source.

* * * * *